Nov. 22, 1927.
L. A. LAURSEN
1,650,078
VULCANIZING APPARATUS
Original Filed March 20, 1923
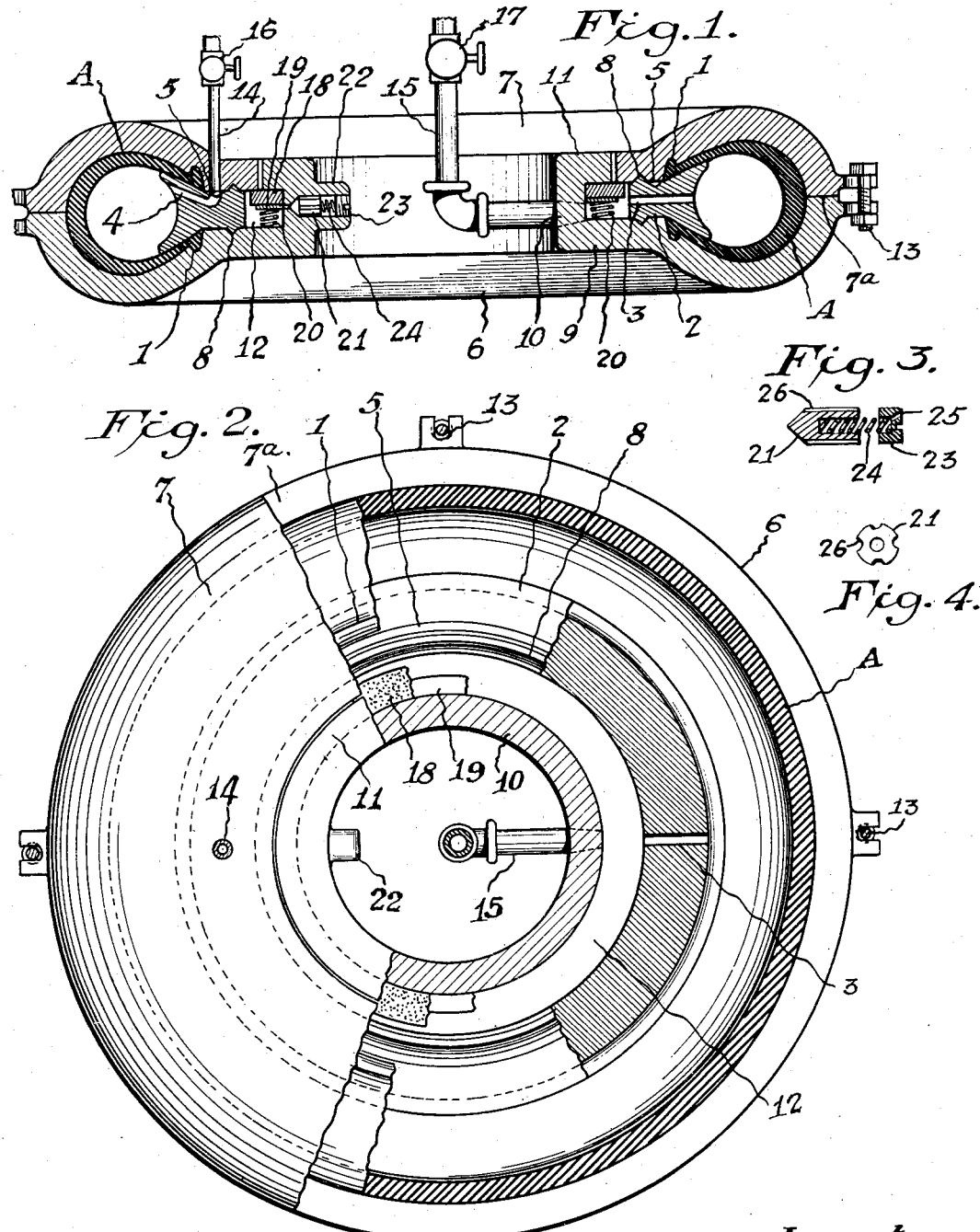
Inventor
L. A. Laursen
By Robb, Robb & Hill Patented Nov. 22, 1927.

1,650,078

UNITED STATES PATENT OFFICE.

LAURITS A. LAURSEN, OF AKRON, OHIO.

VULCANIZING APPARATUS.

Original application filed March 20, 1923, Serial No. 626,390. Divided and this application filed January 16, 1924, Serial No. 686,486. Renewed April 26, 1927.

The present invention relates to an apparatus for vulcanizing hollow rubber articles, such as the casings for pneumatic tires, and the subject matter of this application has been divided out of a copending application for a vulcanizing apparatus which was filed by me on March 20, 1923, Serial No. 626,390.

According to the present invention fluid pressure is provided and maintained within the rubber article for expanding it into a tight engagement with the interior walls of the mold. The use of this fluid pressure results in holding the rubber article or tire against the mold with a uniform pressure at every point, so that the finished article or tire has no blemishes on the outer face thereof and the percentage of defective tires or seconds is very small.

Heretofore it has usually been customary to employ a bag or tube to receive the fluid where fluid pressure has been used on the interior of the rubber article or tire, and one of the objects of the present invention is to provide a novel construction which will eliminate the necessity of using such a bag or tube, and will at the same time provide a leak proof mold without the necessity of providing a number of expensive ground joints.

Further objects of the invention are to provide a vulcanizing apparatus of this character which can be readily assembled and taken apart, which comprises few and durable parts, which can be used in the conventional vulcanizer pots or containers, and which will easily withstand the rough handling to which such devices are ordinarily subjected when in use.

For a full understanding of the invention reference is to be had to the following description and accompanying drawings, in which Figure 1 is a transverse sectional view through a vulcanizing mold which is constructed in accordance with the invention, showing a tire in position therein preparatory to being vulcanized.

Figure 2 is a plan view of the mold with portions broken away and shown in section to illustrate more clearly the various features of construction.

Figure 3 is an enlarged sectional view through the automatic pressure relief valve and associated parts, and Figure 4 is a rear end view of the pressure relief valve.

Corresponding and like parts are referred to in the following description and indicated on all of the views of the drawings by like reference characters.

Referring to the drawings which illustrate one of many possible embodiments of the invention, the reference character A designates a conventional tire casing which is adapted to be built up of fabric and rubber compound in accordance with the usual practice in making hollow tire casings. The tire may be of any suitable design or configuration, and is shown in the present instance as provided at its edge portions with the usual beads 1. It will be understood, however, that the apparatus may be used in the manufacture of straight side tires or any other design or configuration of tire, as well as for the manufacture of clincher tires. During the period of curing or vulcanizing the rubber compound some inert liquid, such as water is adapted to be introduced into the interior of the tire A and to be maintained under a suitable pressure so that the tire will be expanded and held in a firm and uniform engagement with the interior walls of the mold.

As will be hereinafter set forth in detail, the invention embodies novel means for preventing leakage of the water or other fluid from the mold and also for maintaining the proper pressure within the tire.

The tire A is adapted to be fitted upon a bull ring 2, which is provided with a radially disposed water passage 3 and an air passage 4. The outer periphery of the bull ring 2 is flared so that it will fit between the sides of the tire casing at the open inner periphery thereof and conform in shape to the converging side walls of the tire. The water passage 3 extends radially through the bull ring from the outer periphery to the inner periphery thereof, while the air passage 4 has a curved inner end and leads from the outer periphery of the bull ring to an annular side groove 5.

Complemental mold sections 6 and 7 are applied to the tire and bull ring from opposite sides thereof and have an annular or ring formation. The outer peripheral portions of the said mold sections have corresponding flat faces or seats which meet in a joint 7ª located at the thread portion of the tire casing A. The inner peripheral portions of the mold sections are suitably recessed to receive the beads 1 of the tire A, and are also formed with annular grooves adapted to receive and interlock with ribs 8 which project laterally from opposite sides of the bull ring.

The mold section 6 is formed at the inner periphery thereof with a member U-shaped in cross section formed of an inwardly projecting extension 9, and this extension terminates in a lateral flange 10 which has an inward flange 11. An annular pocket or chamber 12 is thus provided by the inward extension and flanges of the mold section 6, said pocket being located between the flanges 10 and 11, and the inner periphery of the bull ring 2 when the mold sections are assembled. The flange 11 is then in alignment with the inner edge of the complemental mold section 7, and after being assembled the mold sections may be clamped or held together in any suitable manner, as by means of the bolts 13.

The mold section 7 is provided with an air outlet pipe 14 which communicates with the before mentioned side groove 5 of the bull ring, and a water supply pipe 15 is connected to the annular flange 10 of the mold section 6 and arranged to communicate with the annular pocket or space 12. The air outlet pipe 14 may be provided with a suitable valve 16, and in a similar manner the water pipe 15 may be provided with a valve 17. Water is pumped or forced into the mold through the water supply pipe 15, being first received in the annular pocket 12, and then flowing through the passage or passages 3 of the bull ring into the interior of the tire A. The mold is then so arranged that the inlet end of the air passage 4 is toward the top of the mold, so that the air which was previously in the mold will escape through the air passage 4, groove 5 and air outlet pipe 14 as the mold is filled with water. After all of the air has escaped and water commences to flow through the air outlet pipe 14, the valve 16 thereof can be closed. The water valve 17 can also be closed after the water within the tire has been placed under the desired presssure.

In order to provide a water tight joint between the inner peripheries of the mold sections, a packing ring 18 is arranged within the annular pocket 12. This packing ring overlaps the joint between the return portion 11 of the flange 10 and the inner edge of the mold section 7. An annular backing plate 19 is arranged back of the packing ring, and springs 20 are interposed between this plate and the extension 9 of the mold section 6. The tension of these springs 20 normally tends to force the packing ring 18 into operative position, and it will be observed that the outer peripheral edge portion of the packing ring extends beyond the backing plate 19 so that the pressure of the water or fluid which is confined within the mold will tend to force the outer edge of the packing ring more tightly against the mold section 7, thereby effectively preventing leakage at this joint. The water with which the mold and tire are filled is placed under a suitable amount of pressure for the purpose of expanding the tire A and tightly compressing it against the walls of the mold. Under ordinary conditions a pressure of about 125 pounds per square inch has been found to produce satisfactory results, although a greater or less pressure may be used as desired or found most satisfactory. This pressure acts upon the free edge of the packing ring and tends to cooperate therewith to provide a leak proof joint between the inner edges of the mold sections, and it will be noted that the packing ring and parts associated therewith are permanently mounted upon the mold section 6, so that they are carried thereby and are always in position to engage the mold section 7 when the various parts of the mold are assembled. The packing elements do not have to be handled separately and will not cause any difficulty or loss of time in assembling the mold or taking it apart.

In order to provide for the expansion of the water as it is heated during the vulcanizing process, the mold is provided with an automatic relief valve 21 which is mounted within a hollow protuberance 22 projecting from the inner periphery of the mold section 6. The inner end of the valve 21 is tapered and engages a ground seat at the inner end of the enlarged opening through the protuberance. A plug 23 is threaded within the outer end of the protuberance 22, and a spring 24 is interposed between the said plug and the valve so that the tension of the spring normally holds the valve in a closed position. The plug 23 is provided with a vent opening 25 and in the sides of the valve 21 are longitudinally extending channels 26. With this construction it will be obvious that when the valve is held in engagement with the ground seat the outlet is closed, although if the pressure within the mold becomes sufficiently great to move the valve outwardly against the action of the spring 24, the fluid or liquid contents of the mold will escape through the side channels 26 of the valve and the vent opening 25 of the plug. The plug is preferably threaded within the protuberance so that it can be adjusted to regulate the tension of the spring, so that the valve will open automatically and relieve the pressure within the mold when the interior pressure of the mold reaches a predetermined point. As soon as the pressure has thus been relieved the valve will again be closed by the action of the spring 24. The water can be initially forced into the mold until it begins to escape through the valve 21, at which time it will be known that the water within the mold is under the desired pressure. Any subsequent expansion of the water which would otherwise tend to increase the pressure beyond the desired joint will open the valve 21 and permit the escape of some of the water until the pressure has been lowered to the desired point. The pressure is thus automatically taken care of by the valve 21 and the desired pressure maintained within the tire during the period of vulcanization.

The vulcanizing mold can be used in connection with any suitable or conventional form of vulcanizer pot, and if desired, a hydraulic ram may be used for forcing the mold sections together. A number of the molds might be superposed and placed in the ram at the same time, and the various molds might be connected in tandem so that they could all be filled with water at a single operation. It will, of course, be understood that where the molds are forced together by a hydraulic ram or other contrivance the use of bolts for fastening the mold sections together may be unnecessary.

While I have illustrated and described one particular embodiment of my invention in detail, it will be understood that many modifications and changes can be made in the details of construction without departing from the spirit of the invention, and I do not wish to be understood as restricting myself to the exact construction which has been shown on the drawing and described in the application for illustrative purposes.

Having thus described my invention what I claim as new and desire to secure by Letters Patent is,

1. A vulcanizing mold for tires and like articles, including complemental mold sections meeting in a joint and having a chamber at the joint, and a packing ring arranged within the chamber and overlapping the joint.

2. A vulcanizing mold for tires and like articles, including complemental mold sections meeting in a joint and having a chamber at the joint, and a packing ring arranged within the chamber to overlap the joint, said packing ring being permanently mounted upon and carried by one of the mold sections.

3. A vulcanizing mold for tires and like articles, including complemental mold sections meeting in a joint, a packing ring for the joint, and means for maintaining a pressure within the mold, the pressure acting upon the packing ring to maintain it effective to perform its packing function.

4. A vulcanizing mold for tires and like articles, including complemental mold sections meeting in a joint, a packing ring overlapping the joint, and means for maintaining a pressure within the mold, the said pressure acting upon the overlapping portion of the packing ring to maintain it effective to perform its packing function.

5. A vulcanizing mold for tires and like articles, including complemental mold sections meeting in a joint, a packing ring permanently mounted upon and carried by one of the mold sections and arranged to overlap the other mold section at the joint, and means for maintaining a pressure within the mold, the said pressure acting upon the overlapping portion of the packing ring to maintain it effective to perform its packing function.

6. A vulcanizing mold for tires and like articles, including complemental mold sections meeting in a joint and having a pressure chamber at the joint, a packing ring arranged within the pressure chamber and extending over the joint, and means for maintaining pressure within the pressure chamber, said packing ring being so arranged that the pressure in the chamber will force it into operative position.

7. A vulcanizing mold for tires and like articles, including complemental mold sections having corresponding edge portions which meet in a joint, a pressure chamber being provided at the joint, a packing ring arranged within the pressure chamber and overlapping the meeting edges of the mold sections, mechanical means for holding the packing ring in engagement with the edge portion of one of the mold sections, and means for maintaining pressure within the pressure chamber, the packing ring being so arranged that the pressure in the chamber will hold it in operative engagement with the edge portion of the other mold section.

8. A vulcanizing mold for tires and like articles, including complemental mold sections formed with edge portions which meet in a joint, a pressure chamber being provided adjacent the joint, a packing ring arranged within the pressure chamber and overlapping the joint, a backing plate engaging one side of the packing ring, means cooperating with the backing plate to force the said side of the packing ring into engagement with the edge portion of one of the mold sections, and means for maintaining pressure within the pressure chamber, the free edge of the packing ring being subjected to the pressure whereby it is held in operative engagement with the other mold section.

9. A vulcanizing mold for tires and like articles, including complemental mold sections applied to the tire and formed with extensions cooperating to provide a pressure chamber, said extensions meeting in a joint at one side of the pressure chamber, a packing ring arranged within the pressure chamber and extending over the joint, said packing ring being arranged so that the pressure in the chamber will force it into operative position.

10. A vulcanizing mold for tires and like articles, including complemental mold sections adapted to be applied to the tire and having extensions which cooperate with each other to form a pressure chamber, said extensions meeting in a joint at one side of the pressure chamber, a packing ring arranged within the pressure chamber and extending over the joint, and means for holding the packing ring in position, a portion of the packing ring being exposed to the pressure of the chamber so that it will be forced tightly into operative position thereby.

11. A vulcanizing mold for tires and like articles, including complemental mold sections adapted to be applied to the tire and formed with extensions which cooperate with each other to provide a pressure chamber, said extensions meeting in a joint at one side of the pressure chamber, a packing ring arranged within the pressure chamber and overlapping the joint, and means for forcing one edge of the packing ring against one of the mold sections, the opposite edge of the packing ring being exposed to the pressure of the chamber so that it will be forced thereby against the other mold section.

12. A vulcanizing mold for tires and like articles, including complemental mold sections meeting in a joint and having a chamber at the joint, a packing ring in the chamber and adapted to seal the joint against fluid leakage, and means in the mold for causing a fluid medium therein to act on the ring to maintain it effective to perform its sealing function.

13. A vulcanizing mold for tires and like articles, including complemental mold sections meeting in a joint, a packing ring arranged to seal the joint, the joint having means to cause a fluid therein to act on the ring to cause the ring to perform its sealing function.

14. A vulcanizing mold for tires and like articles, including complemental mold sections meeting in a joint, a packing ring arranged to seal the joint, the mold having a passage to conduct a fluid medium to a side of the ring, and means for conducting such fluid medium into the mold to press on the ring and maintain it effective to seal the joint.

In testimony whereof I affix my signature.

LAURITS A. LAURSEN.